United States Patent
McCaffrey (10) Patent No.: US 12,247,497 B2
(45) Date of Patent: *Mar. 11, 2025

(54) AIRFOIL ATTACHMENT FOR TURBINE ROTOR

(71) Applicant: RTX CORPORATION, Farmington, CT (US)

(72) Inventor: Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,547

(22) Filed: Mar. 20, 2023

(65) Prior Publication Data

US 2023/0250728 A1 Aug. 10, 2023

Related U.S. Application Data

(63) Continuation of application No. 17/146,541, filed on Jan. 12, 2021, now Pat. No. 11,608,750.

(51) Int. Cl.
*F01D 5/30* (2006.01)
*F01D 5/02* (2006.01)
*F02C 7/36* (2006.01)

(52) U.S. Cl.
CPC ............. *F01D 5/3007* (2013.01); *F01D 5/02* (2013.01); *F02C 7/36* (2013.01); *F01D 5/3084* (2013.01); *F05D 2220/32* (2013.01); *F05D 2240/24* (2013.01); *F05D 2260/40311* (2013.01); *F05D 2300/6033* (2013.01)

(58) Field of Classification Search
CPC ............ F01D 5/02; F01D 5/30; F01D 5/3007; F01D 5/3084; F02C 7/36; F05D 2220/32; F05D 2240/24; F05D 2300/6033; F05D 2260/40311

See application file for complete search history.

(56) References Cited

U.S. PATENT DOCUMENTS 5,846,054 A * 12/1998 Mannava .............. F01D 5/3007
416/222
6,857,856 B2    2/2005 Potter et al.
(Continued)

OTHER PUBLICATIONS

Partial European Search Report for European Patent Application No. 22151234.6 mailed Oct. 17, 2022.

*Primary Examiner* — Elton K Wong
(74) *Attorney, Agent, or Firm* — Carlson, Gaskey & Olds, P.C.

(57) ABSTRACT

A turbine for a gas turbine engine includes, among other things, a shaft rotatable about a longitudinal axis, a turbine rotor including one or more rows of turbine blades and a disk assembly coupled to the shaft. The disk assembly includes one or more disks each having an attachment region extending radially between an inner boundary and an outer boundary, the outer boundary is established by an outer periphery of the respective disk, the attachment region defines an array of slots distributed about the outer periphery, each of the slots extends radially inwardly from the outer boundary to the inner boundary, and each of the slots is dimensioned to receive a root section of a respective one of the turbine blades to mount the turbine blades to the disk assembly.

20 Claims, 6 Drawing Sheets

(56) References Cited

U.S. PATENT DOCUMENTS

| | | | |
|---|---|---|---|
| 7,798,779 B2 * | 9/2010 | Nogami | F01D 5/3007 416/248 |
| 8,573,947 B2 | 11/2013 | Klinetob et al. | |
| 10,119,400 B2 | 11/2018 | Virkler | |
| 10,655,479 B2 | 5/2020 | Sippel et al. | |
| 11,608,750 B2 * | 3/2023 | McCaffrey | F02C 7/36 |
| 2007/0077146 A1 * | 4/2007 | Suzuki | F01D 5/3007 416/219 R |
| 2008/0240912 A1 * | 10/2008 | Wassynger | F01D 5/3007 29/889.22 |
| 2009/0257877 A1 * | 10/2009 | Alvanos | F01D 5/3007 416/219 R |
| 2012/0163979 A1 * | 6/2012 | Darkins, Jr. | F01D 5/225 416/223 R |
| 2012/0291449 A1 * | 11/2012 | Adams | F02K 3/06 60/793 |
| 2013/0022469 A1 | 1/2013 | McCaffrey | |
| 2013/0192265 A1 * | 8/2013 | Schwarz | F02C 3/067 415/220 |
| 2013/0192266 A1 | 8/2013 | Houston et al. | |
| 2014/0109548 A1 * | 4/2014 | Virkler | F01D 5/02 29/889.21 |
| 2015/0322806 A1 * | 11/2015 | Twelves, Jr. | F01D 5/3084 403/30 |
| 2020/0263635 A1 * | 8/2020 | Bemment | F02C 7/045 |

\* cited by examiner

AIRFOIL ATTACHMENT FOR TURBINE ROTOR

CROSS-REFERENCE TO RELATED APPLICATION

This application is a continuation application of U.S. application Ser. No. 17/146,541, filed on Jan. 12, 2021.

BACKGROUND

This application relates to gas turbine engines, including airfoil attachment for turbine rotors.

Gas turbine engines are known, and may include a fan delivering air into a low pressure compressor. The air is compressed in the low pressure compressor, and passed into a high pressure compressor. From the high pressure compressor the air is introduced into a combustor section where it is mixed with fuel and ignited. Products of this combustion pass downstream to a high pressure turbine rotor, and then a low pressure turbine rotor to extract energy for driving the fan. Each turbine rotor may include a disk that mounts one or more turbine blades.

SUMMARY

A turbine for a gas turbine engine according to an example of the present disclosure includes a shaft rotatable about a longitudinal axis. A turbine rotor includes one or more rows of turbine blades and a disk assembly coupled to the shaft. Each of the turbine blades includes an airfoil section extending radially outwardly from a root section relative to the longitudinal axis. Each of the turbine blades comprises a ceramic matrix composite (CMC) material. The disk assembly includes one or more disks each having an attachment region extending radially between an inner boundary and an outer boundary. The outer boundary is established by an outer periphery of the respective disk. The attachment region defines an array of slots distributed about the outer periphery. Each of the slots extends radially inwardly from the outer boundary to the inner boundary. Each of the slots is dimensioned to receive the root section of a respective one of the turbine blades to mount the turbine blades to the disk assembly. The inner boundary establishes a live rim radius relative to the longitudinal axis. The outer boundary establishes a dead rim radius relative to the longitudinal axis. Each of the one or more disks establishes a disk ratio of the live rim radius to the dead rim radius, and the disk ratio is greater than or equal to 0.8:1 for at least one disk of the one or more disks.

In a further embodiment of any of the foregoing embodiments, the one or more rows of turbine blades includes a plurality of rows of turbine blades distributed axially with respect to the longitudinal axis. The one or more disks includes a plurality of disks that mount respective rows of the plurality of rows of turbine blades, and the at least one disk establishing the disk ratio includes an aftmost one of the plurality of disks relative to the longitudinal axis.

In a further embodiment of any of the foregoing embodiments, the disk ratio is greater than or equal to 0.8:1 for each one of the plurality of disks in the turbine.

In a further embodiment of any of the foregoing embodiments, each of the rows of turbine blades establishes a radial distance between the longitudinal axis and a radially outermost portion of the turbine blades and establishes a blade ratio of the dead rim radius to the radial distance, and the blade ratio is less than or equal to 0.5:1 for at least an aftmost row of the plurality of rows of turbine blades.

In a further embodiment of any of the foregoing embodiments, the disk ratio is greater than or equal to 0.85:1 and is less than or equal to 0.95:1 for each one of the plurality of disks in the turbine.

In a further embodiment of any of the foregoing embodiments, a cross-sectional area is defined at a downstream end of the turbine rotor. The turbine rotor is rotatable at a first speed measured at an engine redline condition. A performance quantity is defined by the cross-sectional area multiplied by the first speed squared, and the performance quantity is equal to or greater than $5.0 \times 10^2$ in$^2$ rpm$^2$.

In a further embodiment of any of the foregoing embodiments, each of the one or more rows of turbine blades defines a respective blade volume associated with a respective disk volume. The blade volume is defined as a sum of the volumes of the portions of the turbine blades between the inner boundary and the outer boundary in an installed position. The disk volume is defined as a sum of the volumes of the portions of the respective disk between the inner boundary and the outer boundary, and a volumetric ratio of the blade volume to the disk volume is equal to or greater than 2.0:1 for the at least one disk.

In a further embodiment of any of the foregoing embodiments, the volumetric ratio is equal to or greater than 2.0:1 and is less than or equal to 4.0:1 for each disk of the one or more disks in the turbine.

In a further embodiment of any of the foregoing embodiments, the attachment region includes an array of attachment members that define the array of slots. A minimum width of each of the attachment members establishes a first width, a minimum width of each of the slots establishes a second width, and a ratio of the first width of each one of the respective attachment members to the second width of an adjacent one of the slots is less than or equal to 0.5:1.

In a further embodiment of any of the foregoing embodiments, each of the one or more rows of turbine blades includes at a quantity of least 40 but no more than 70 turbine blades.

In a further embodiment of any of the foregoing embodiments, a total number of the rows of turbine blades includes at least three rows, but no more than six rows. The shaft interconnects the disk assembly and a geared architecture that drives a fan for propulsion.

A turbofan gas turbine engine according to an example of the present disclosure includes a fan section including a fan and a fan case surrounding the fan to define a bypass duct. The fan is rotatable about an engine longitudinal axis. A compressor section includes a first compressor and a second compressor. A turbine section includes a first turbine and a fan drive turbine. The first turbine includes a first turbine rotor, and the fan drive turbine includes a fan drive turbine rotor. At least one of the first turbine rotor and the fan drive turbine rotor includes one or more rows of turbine blades and a disk assembly. Each of the turbine blades includes an airfoil section extending from a root section, and each of the turbine blades includes a ceramic matrix composite (CMC) material. The disk assembly includes one or more disks each having an attachment region extending radially between an inner boundary and an outer boundary relative to the engine longitudinal axis. The outer boundary is established by an outer periphery of the respective disk. The attachment region defines an array of slots distributed about the outer periphery. Each of the slots extend radially inwardly from the outer boundary to the inner boundary, and each of the slots is dimensioned to receive the root section of a respective one of the turbine blades to mount the turbine blades to the disk assembly. Each of the one or more rows of turbine blades defines a respective blade volume associated with a respective disk volume. The blade volume is defined as a sum of the volumes of the portions of the turbine blades between the inner boundary and the outer boundary in an installed position. The disk volume is defined as a sum of the volumes of the portions of the respective disk between the inner boundary and the outer boundary, and a volumetric ratio of the blade volume to the disk volume is equal to or greater than 2.0:1 and is less than or equal to 4.0:1 for at least one disk of the one or more disks.

In a further embodiment of any of the foregoing embodiments, the fan drive turbine rotor is axially aft of the first turbine rotor relative to the engine longitudinal axis, a first turbine shaft interconnects the first compressor and the first turbine rotor, and a fan drive turbine shaft interconnecting a geared architecture and the fan drive turbine rotor such that the fan drive turbine rotor drives the fan through the geared architecture.

In a further embodiment of any of the foregoing embodiments, the fan drive turbine comprises the at least one disk. A total number of the rows of turbine blades in the fan drive turbine includes at least three rows, but no more than six rows. A cross-sectional area is defined at a downstream end of the fan drive turbine rotor. The fan drive turbine rotor is rotatable at a first speed measured at an engine redline condition. A performance quantity is defined by the cross-sectional area multiplied by the first speed squared, and the performance quantity is greater than or equal to $3.5 \times 10^2$ in$^2$ rpm$^2$ and is less than or equal to $6.0 \times 10^2$ in$^2$ rpm$^2$.

In a further embodiment of any of the foregoing embodiments, the inner boundary establishes a live rim radius relative to the longitudinal axis. The outer boundary establishes a dead rim radius relative to the longitudinal axis. Each of the one or more disks establishes a disk ratio of the live rim radius to the dead rim radius, and the disk ratio is greater than or equal to 0.8:1 for the at least one disk.

In a further embodiment of any of the foregoing embodiments, each of the one or more rows of turbine blades includes a quantity of at least 25 but no more than 100 turbine blades.

In a further embodiment of any of the foregoing embodiments, the volumetric ratio is equal to or greater than 2.0:1 and is less than or equal to 4.0:1 for each disk of the one or more disks in the fan drive turbine.

In a further embodiment of any of the foregoing embodiments, the disk ratio is less than or equal to 0.95:1 for each disk of the one or more disks in the fan drive turbine.

In a further embodiment of any of the foregoing embodiments, the attachment region includes an array of attachment members that define the array of slots, a minimum width of each of the attachment members establishes a first width, a minimum width of each of the slots establishes a second width, and a ratio of the first width of each one of the respective attachment members to the second width of an adjacent one of the slots is less than or equal to 0.5:1.

In a further embodiment of any of the foregoing embodiments, the one or more rows of turbine blades includes a plurality of rows of turbine blades. Each of the rows of turbine blades establishes a radial distance between the engine longitudinal axis and a radially outermost portion of the turbine blades and establishes a blade ratio of the dead rim radius to the radial distance, and the blade ratio is less than or equal to 0.5:1 for at least an aftmost row of the plurality of rows of turbine blades.

In a further embodiment of any of the foregoing embodiments, the fan drive turbine rotor is axially aft of the first turbine rotor relative to the engine longitudinal axis. A first turbine shaft interconnects the first compressor and the first turbine rotor, and a fan drive turbine shaft interconnecting an epicyclic geared architecture and the fan drive turbine rotor such that the fan drive turbine rotor drives the fan through the geared architecture.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 7 illustrates a disk of the turbine of FIG. 5.
Like reference numbers and designations in the various drawings indicate like elements.

DETAILED DESCRIPTION

Figure 1:
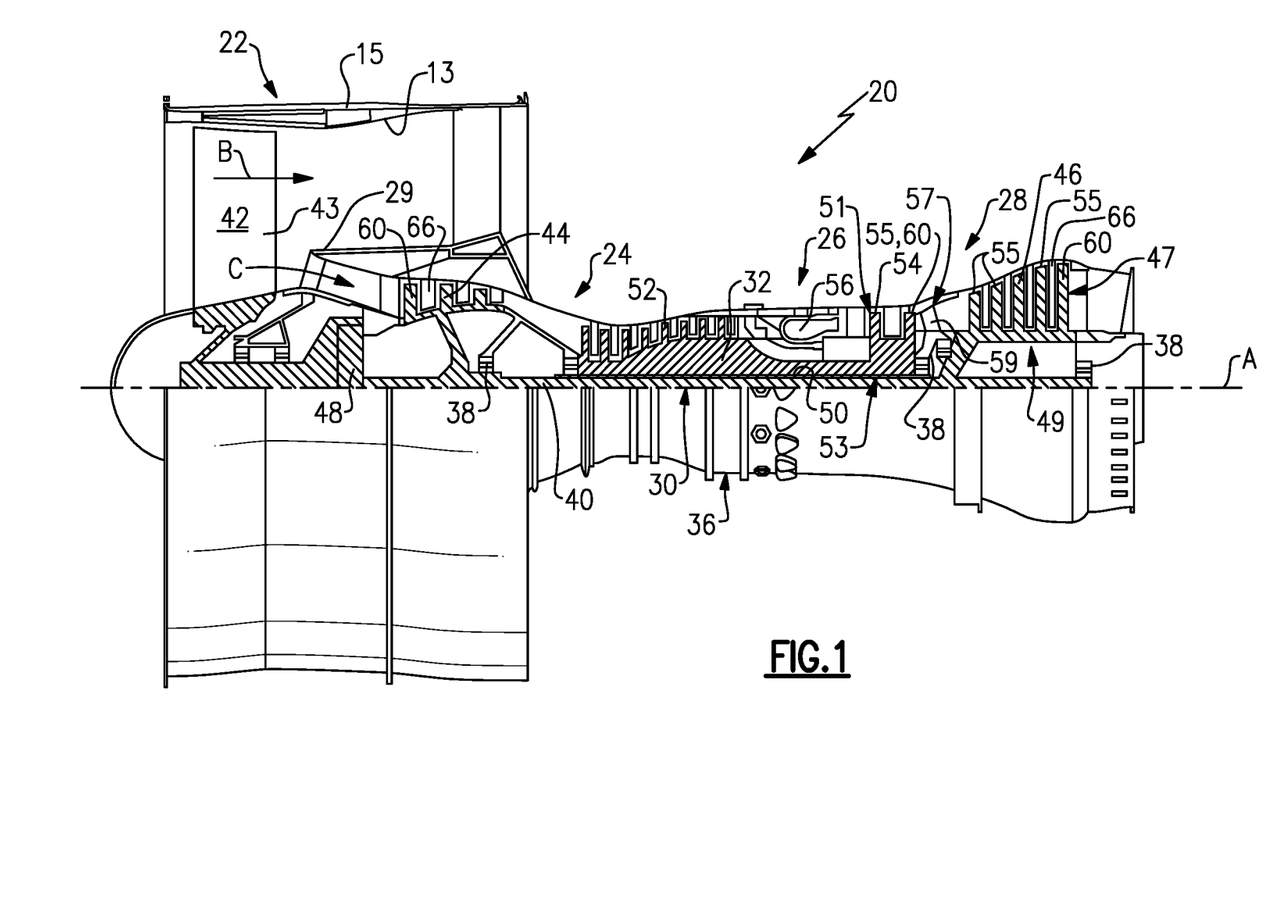
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 60, and the vanes are schematically indicated at 66.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42 is rotatable about an engine longitudinal axis A to deliver airflow to the bypass duct 13. The gas turbine engine 20 can be rated to produce about 15,000 pounds of thrust or more at a takeoff condition, or more narrowly between about 20,000 and about 60,000 pounds of thrust at the takeoff condition.

The low pressure turbine 46 includes a low pressure (e.g., second or fan drive) turbine rotor 47 rotatable about the longitudinal axis A. The turbine rotor 47 can be coupled to the inner (e.g., second turbine) shaft 40. The turbine rotor 47 includes a disk assembly 49 which can be supported by, and can be mechanically attached or otherwise coupled to, the inner shaft 40. The high pressure turbine 54 includes a high pressure (e.g., first) turbine rotor 51 rotatable about the longitudinal axis A. The turbine rotor 51 can be coupled to the outer (e.g., first turbine) shaft 50. The outer shaft 50 interconnects the turbine rotor 51 and high pressure compressor 52. The turbine rotor 47 can be axially aft of the turbine rotor 51 relative to the engine longitudinal axis A. The turbine rotor 51 includes a disk assembly 53 which can be supported by, and can be mechanically attached or otherwise coupled to, the outer shaft 50. Each of the disk assemblies 49, 53 can carry one or more rows 55 of turbine blades 60 distributed axially with respect to the longitudinal axis A. The turbine blades 60 can be arranged to extract energy from combustion products communicated in the core flow path C. The inner shaft 40 can interconnect the disk assembly 49 and geared architecture 48 such that the turbine rotor 47 drives the fan 42 through the geared architecture 48 for propulsion. In other examples, the geared architecture 48 is omitted such that the turbine rotor 47 drives the fan 42 at a common speed and in a common direction.

A total number of the rows 55 of the turbine blades 60 of the high pressure turbine rotor 51 in the high pressure turbine 54 can include at least one or two rows 55, for example. A total number of the rows 55 of the turbine blades 60 of the low pressure turbine rotor 47 in the low pressure turbine 46 can include at least three rows 55, or more narrowly no more than six rows 55, such as four or five rows 55, for example. Each row 55 of turbine blades 60 can include any of the blade configurations and materials disclosed herein, including unshrouded and shrouded turbine blades constructed of ceramic matrix composite (CMC), monolithic ceramics and other ceramic materials.

Each of the rows 55 can include various quantities of turbine blades 60. One or more, or each, row 55 of turbine blades 60 in the turbine rotor 47 and/or turbine rotor 51 can include a quantity of at least 25 turbine blades 60, or more narrowly no more than 100 turbine blades 60, such as a quantity of at least 40 turbine blades 60 but no more than 70 turbine blades 60. The disclosed quantities of turbine blades can be utilized in combination with the disk assemblies disclosed herein to provide a relatively lightweight turbine arrangement.

Figure 2:
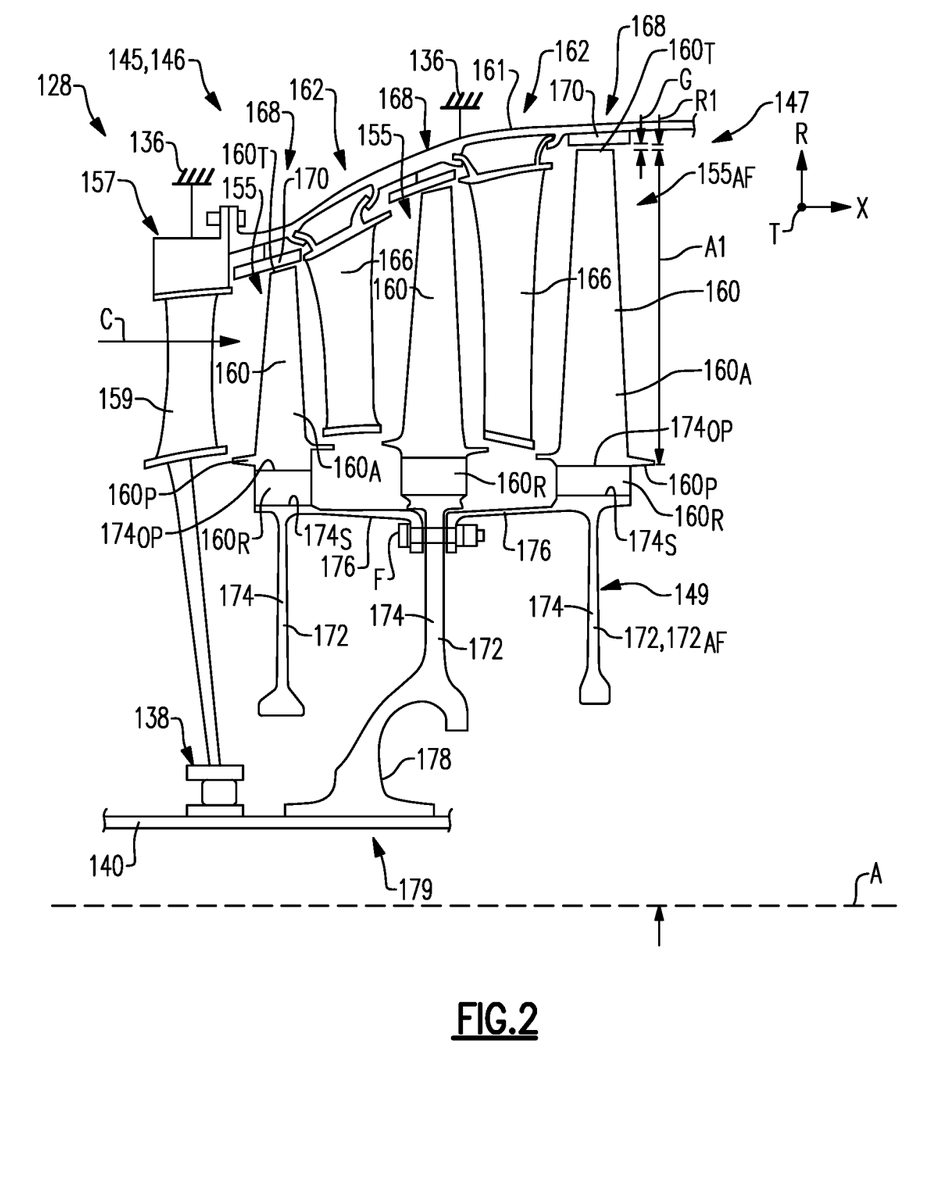
FIG. 2 illustrates an example turbine section.

FIG. 2 illustrates an exemplary turbine section 128. The turbine section 128 can be incorporated into a gas turbine engine, such as the turbofan gas turbine engine 20 of FIG. 1. Other portions of the engine 20 that attach airfoils including the fan section 22 and compressor section 24, and other systems may benefit from the teachings disclosed herein, including gas turbine engines lacking a fan for propulsion. In this disclosure, like reference numerals designate like elements where appropriate and reference numerals with the addition of one-hundred or multiples thereof designate modified elements that are understood to incorporate the same features and benefits of the corresponding original elements.

The turbine section 128 can include at least one turbine assembly 145. The turbine assembly 145 may be incorporated into the high pressure turbine 52 and/or low pressure turbine 46 of FIG. 1. In the illustrative example of FIG. 2, the turbine assembly 145 is a fan drive (e.g., second) turbine 146 including a turbine rotor 147. The turbine rotor 147 includes a disk assembly 149 that carries one or more rows 155 of turbine blades 160. The rows 155 of turbine blades 160 are distributed axially in a direction X, which can be substantially parallel to the longitudinal axis A. Each turbine blade 160 can include an airfoil section $160_A$ that extends radially outward in a radial direction R from a platform $160_P$ to a tip $160_T$ relative to the longitudinal axis A. The platform $160_P$ can be integrally formed with the airfoil section $160_A$ or can be a separate and distinct component. Each turbine blade 160 includes a root section $160_R$ mechanically attached or otherwise secured to the disk assembly 149.

The turbine assembly 145 can include a turbine case 161 and one or more rows 162 of turbine vanes 166 arranged downstream and axially aft of adjacent rows 155 of turbine blades 160. One or more rows 168 of blade outer air seals (BOAS) 170 can be arranged in an array in a circumferential or thickness direction T about and radially outward of each respective row 155 of turbine blades 160. The BOAS 170 are positioned in close proximity to the tips $160_T$ of the turbine blades 160 to establish a respective clearance gap G. The vanes 166 and BOAS 170 can be mechanically attached to the turbine case 161 or another portion of the engine static structure 136.

A dimension of the clearance gap G may change during engine operation due to various factors, including thermal growth of the turbine case 161 due to relatively hot gases communicated in the core flow path C. Forces imposed on the turbine rotor 147 and other factors may cause the turbine rotor 147 to deflect relative to the engine longitudinal axis A and a dimension of the clearance gap G to change. The techniques disclosed herein can be utilized to reduce deflection and variation of a dimension of the clearance gap G. Lower variation may be utilized to design the turbine blades 160 to establish relatively smaller clearance gaps G, which can reduce gas path losses and improve turbine efficiency.

The disk assembly 149 includes one or more disks 172. Each disk 172 can be dimensioned to carry or mount a respective row 155 of the turbine blades 160. Each disk 172 includes a disk portion 174 defining one or more slots $174_S$ distributed about an outer periphery $174_{OP}$ of the disk portion 174. The root section $160_R$ of the turbine blades 160 can be received in a respective one of the slot $174_S$ to mount the turbine blades 160 to the disk assembly 149.

The disks 172 can be mechanically attached to each other such that the disks 172 and turbine blades 160 rotate together as a unit about the longitudinal axis A. The disk assembly 149 can include one or more connecting arms 176 that mechanically attach the disk portions 174 of adjacent disks 172 together with one or more fasteners F, for example. One or more of the disks 172 can include an attachment portion or hub 178 extending from the disk portion 174. The hub 178 can mechanically attach and interconnect the disk assembly 149 to the inner shaft 140 at an attachment point 179. The hub 178 can be dimensioned to have a relatively greater thickness and/or mass than the respective disk portion 174 as illustrated in FIG. 2, but may not contribute relatively high amounts of centrifugal loading on the disk assembly 149 due to the proximity of the hub 178 to the engine axis A. Although FIG. 2 illustrates only one of the disks 172 having a hub 178, it should be understood that each of the disks 172 may have a respective hub 178 coupled to the inner shaft 140.

Various materials may be utilized to construct the turbine rotor 147. The disk assembly 149 including each of the disks 172 and the respective disk portions 174 and hub(s) 178 can be constructed of a first material, and the turbine blades 160 can be constructed of a second material. The second material can be the same or can differ from the first material. For example, the disk assembly 149 including each of the disks 172 and the respective disk portions 174 and hub 178 can comprise a metallic material, and the turbine blades 160 can comprise a ceramic matrix composite (CMC) and other ceramic material. In examples, the disk assembly 149 including each of the disks 172 and the respective disk portions 174 and hub(s) 178 is substantially metallic. A composition of each of the disks 172 may be the same or may differ. For the purposes of this disclosure, the terms "approximately", "about" and "substantially" mean±5 percent of the stated value or relationship unless otherwise indicated. Metallic materials can include metals and alloys, such as a nickel or cobalt-based superalloy, for example. The turbine blades 160 may be constructed from various ceramic materials. For example, one or more (or each) of the rows 155 of the turbine blades 160 may comprise a monolithic ceramic or CMC material. Various CMC materials can be utilized, including one or more layers having various fiber constructions of ceramic fibers in a matrix. Example fiber constructions can include uni-tape plies, fabrics, two-dimensional and three-dimensional weaves of fibers. Uni-tape plies include fibers oriented in the same direction ("unidirectional"), and fabrics includes woven or interlaced fibers. Other fiber materials can be utilized, including carbon, aramid, and/or a combination of materials. An example CMC construction includes silicon carbide (SiC) composites (SiC/SiC).

Constructing the turbine blades 160 according to the materials disclosed herein, including the airfoil section $160_A$ and/or the root section $160_R$, can reduce centrifugal loading and structural demands on the disk assembly 149 including the disks 172, and can reduce a weight and spinning mass of the turbine rotor 147. A reduction in mass can reduce a moment of inertia of the turbine rotor 147 by as much as 50% or more during engine operation, which can reduce deflection of the turbine rotor 147. Reduced deflection can lead to reduced variability of a dimension of the clearance gap G, which may improve turbine efficiency.

Each of the rows 155 of turbine blades 160 establishes a radial distance R1 between the longitudinal axis A and the radially outermost portion of the turbine blades 160. The radially outermost portion of the turbine blades 160 can be established by the tips $160_T$ of the turbine blades 160. The radial distance R1 is illustrated with respect to the aftmost row $155_{AF}$ of the turbine blades 160 for illustrative purposes. The turbine blades 160 can be dimensioned such that the radial distance R1 progressively increases in an aftwards direction for each of the rows 155 of turbine blades 160 with respect to the longitudinal axis A, as illustrated in FIG. 2.

The techniques disclosed herein, including the disclosed relationships and attachment techniques, can be utilized to establish a relatively high speed, compact turbine arrangement. A first cross-sectional area A1 is defined at a downstream end of the turbine rotor 147. The turbine rotor 147 is rotatable at a first speed N measured at an engine redline condition. A performance quantity ($AN^2$) of the turbine rotor 147 is defined by the cross-sectional area A1 multiplied by the first speed N squared. The performance quantity can be equal to or greater than about 3.5 times 10 squared ($3.5 \times 10^2$) $in^2$ $rpm^2$, or more narrowly less than or equal to about $6.0 \times 10^2$ $in^2$ $rpm^2$. The performance quantity can be equal to or greater than about 5.0 times 10 squared ($5.0 \times 10^2$) $in^2$ $rpm^2$. The first speed N can be between about 10,000 and about 15,000 rpm at the redline condition, for example.

Figure 3:
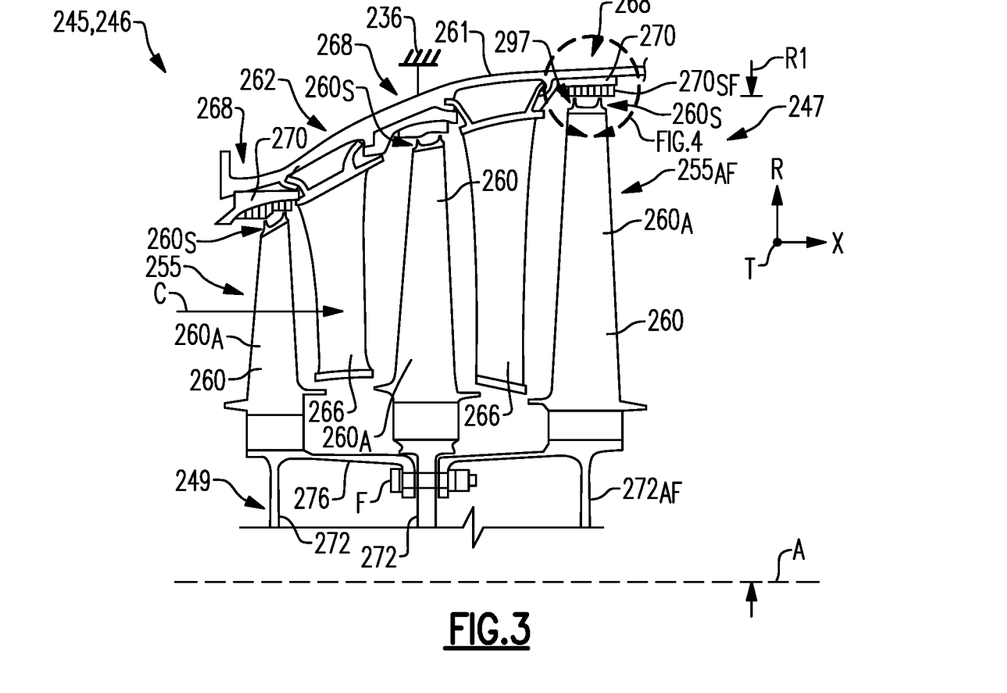
FIG. 3 illustrates a turbine according to another example.

Other turbine blade configurations may be utilized with the teachings disclosed herein. In the illustrative example of FIG. 3, turbine assembly 245 includes one or more rows 255 of shrouded turbine blades 260. Each of the turbine blades 260 includes an airfoil section $260_A$ and a shroud $260_S$ extending from an outer periphery of the airfoil section $260_A$. The shroud $260_S$ is dimensioned to face an adjacent row 268 of BOAS 270. Although each row 255 of turbine blades 260 is illustrated as a shrouded turbine blade 260 in FIG. 3, it should be understood that the turbine assembly 245 can have one or more rows of unshrouded turbine blades (see, e.g., turbine blades 160 of FIG. 2). The shroud $260_S$ may be made of any of the materials disclosed herein, including metallic materials and/or non-metallic materials such as CMC and other ceramic materials. A radial distance R1 can be established in a radial direction R between the longitudinal axis A and a radially outermost portion of the turbine blades 260 relative to the longitudinal axis A. The radially outermost portion of the turbine blade 260 can be established by the shroud $260_S$, as illustrated in FIG. 3. The turbine blades 260 can be dimensioned and arranged to establish any of the relationships and values disclosed herein.

Figure 4:
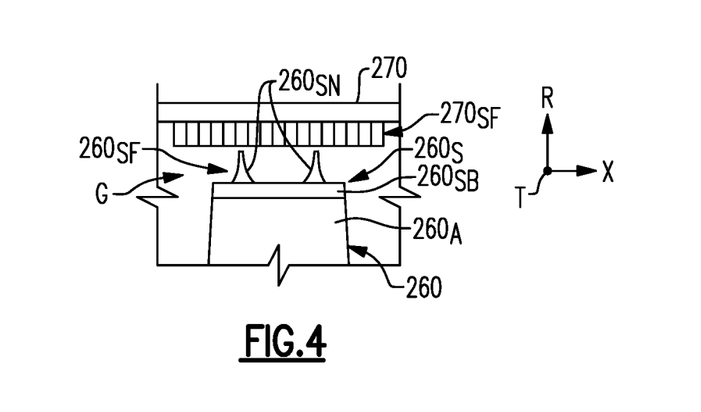
FIG. 4 illustrates portions of the turbine of FIG. 3.

Referring to FIG. 4, with continuing reference to FIG. 3, the shroud $260_S$ can include a base portion $260_{SB}$ mechanically attached or otherwise secured to the outer periphery of the airfoil section $260_A$. The shroud $260_S$ can include a first sealing feature $260_{SF}$ extending outwardly from the base portion $260_{SB}$. The first sealing feature $260_{SF}$ can include one or more knife edge features $260_{SX}$, for example. Each of the knife edge feature $260_{SX}$ can include various geometries extending in the axial and/or radial directions X, R. The knife edge features $260_{SX}$ can reduce a dynamic pressure component of the total pressure of the leakage flow through a clearance gap G between the turbine blades 260 and BOAS 270. Each BOAS 270 can include a second sealing feature $270_{SF}$ arranged to face the shroud $260_S$. The first sealing feature $260_{SF}$ and second sealing feature $270_{SF}$ cooperate to establish a sealing relationship along the clearance gap G. The second sealing feature $270_{SF}$ can be formed from an abradable, ceramic or nickel-based alloy material, for example, such that the shroud $260_S$ of each turbine blade 260 cuts or machines a relatively small leakage path through the clearance gap G for all flight conditions, accounting for the different relative thermal characteristics of the shrouded blades 260, disk assembly 249 and turbine case 261, as well as the various loads and resulting deflections experienced by the turbine rotor 247. The reduced leakage of gases through the clearance gap G can improve overall efficiency of the turbine assembly 245.

Figure 5:
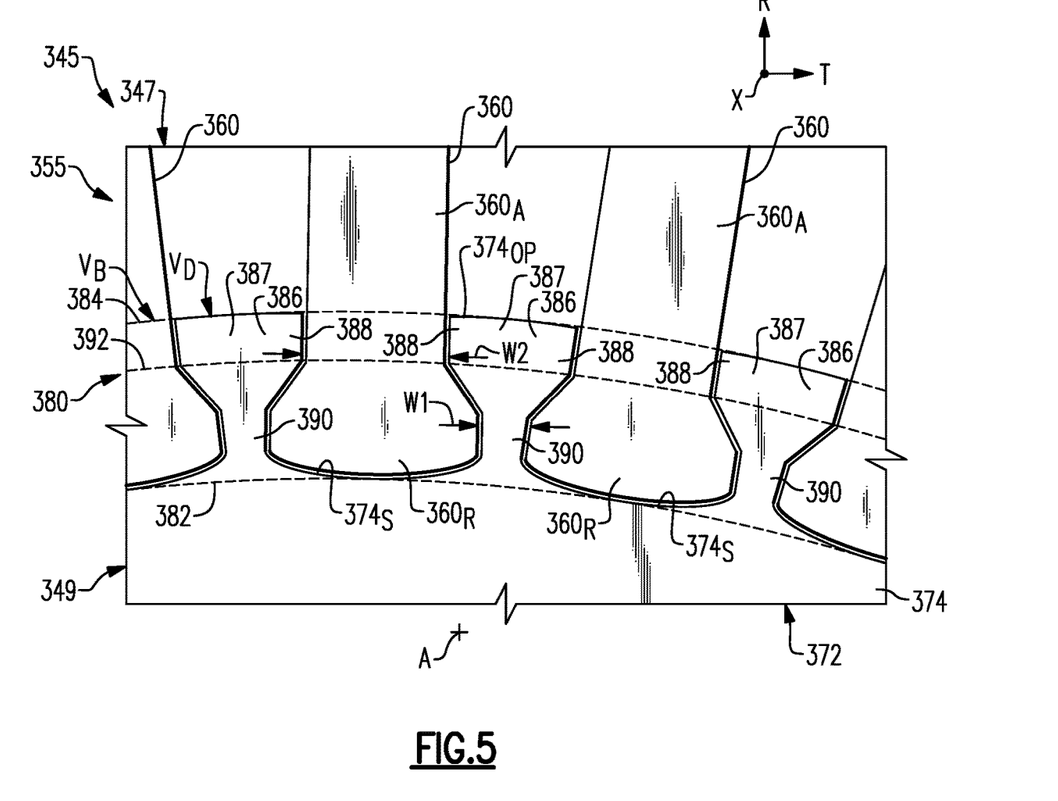
FIG. 5 illustrates a turbine including turbine blades in an installed position.
Figure 6:
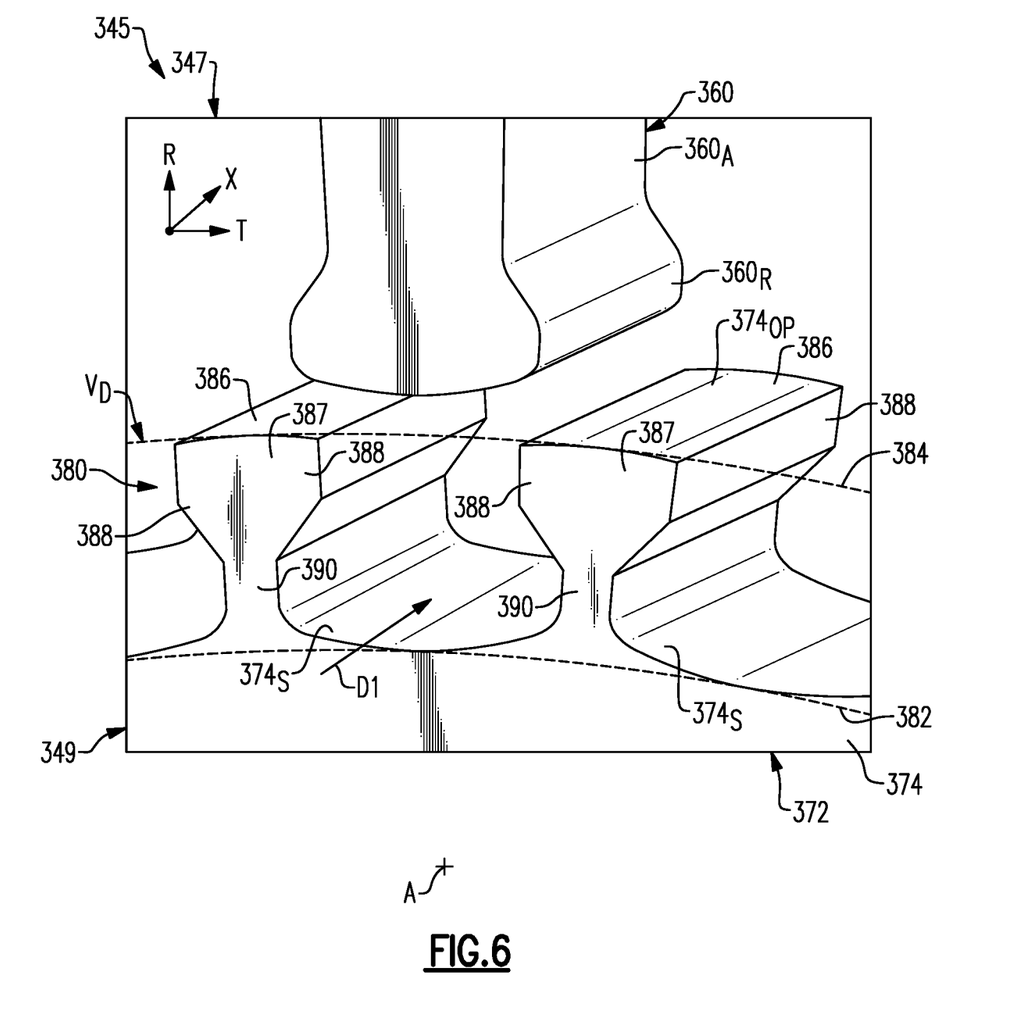
FIG. 6 illustrates the turbine of FIG. 5 including one of the turbine blades in an uninstalled position.
Figure 7:
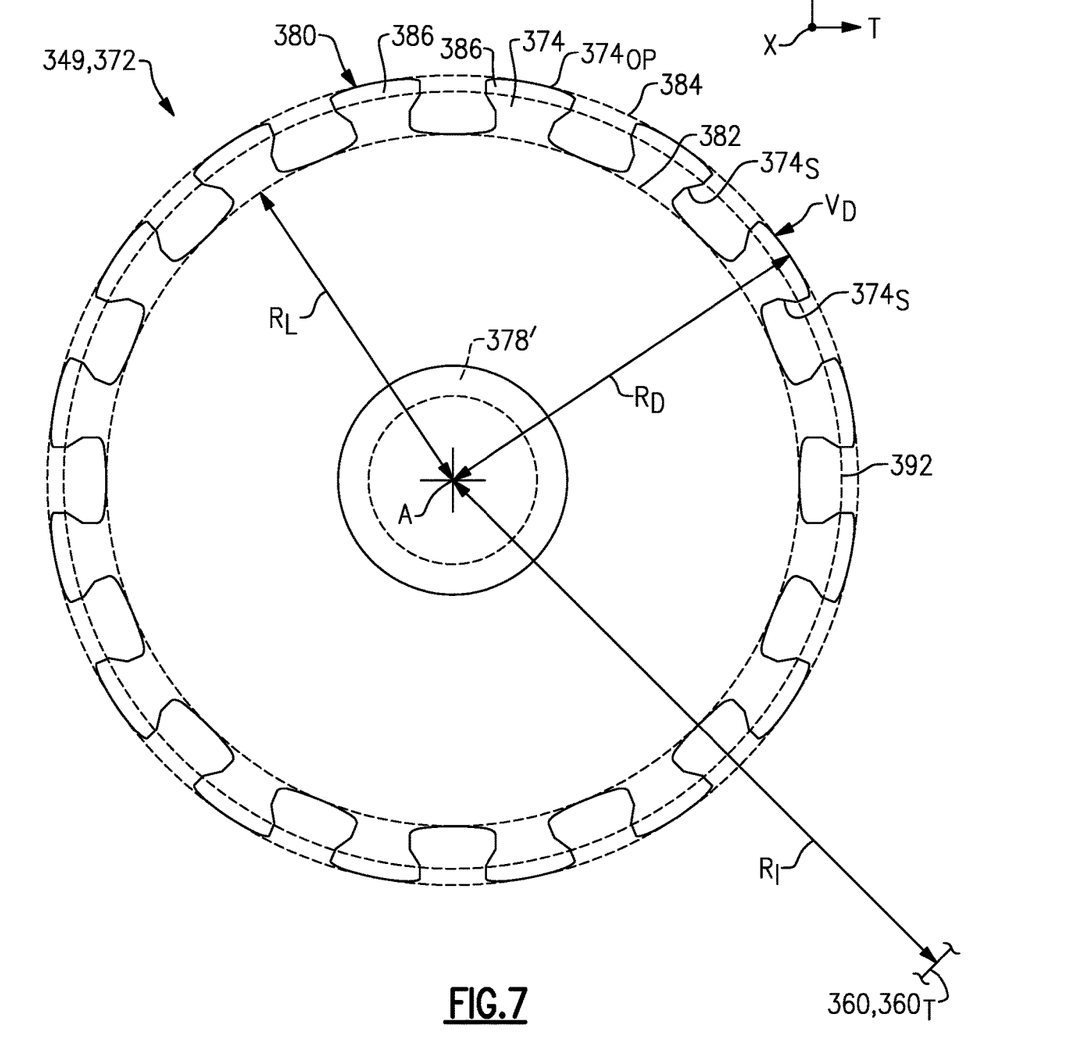

FIGS. 5-7 illustrate a turbine assembly 345 according to another example. The turbine assembly 345 includes a turbine rotor 347 rotatable about a longitudinal axis A. Referring to FIG. 5, the turbine rotor 347 includes a disk assembly 349 and turbine blades 360. The disk assembly 349 includes one or more disks 372 that carry a respective row 355 of the turbine blades 360 (one row 355 of blades 360 and one disk 372 shown for illustrative purposes, see also FIGS. 2-3). The turbine assembly 345 can be incorporated into any of the turbines disclosed herein, such as the turbines 46, 146 and 246 and turbine 54. For example, each of the stages of the turbines 46, 54 and turbines 146, 246 can incorporate the disk 372 to establish any of the relationships and values disclosed herein. The disk 372 can include a disk portion 374 and may include an attachment portion or hub 378' (shown in dashed lines in FIG. 7 for illustrative purposes).

Each disk 372 includes an attachment region 380 for mounting a respective row 355 of turbine blades 360 to the disk assembly 349. The attachment region 380 may be established by the disk portion 374 of the disk 372. The attachment region 380 is dimensioned to extend radially in a radial direction R between an inner boundary 382 and an outer boundary 384 relative to an engine longitudinal axis A (boundaries 382, 384 shown in dashed lines for illustrative purposes). The attachment region 380 is dimensioned such that the outer boundary 384 surrounds the inner boundary 382. The outer boundary 384 can be established by an outer periphery 374op of the respective disk 372.

The attachment region 380 can be dimensioned to react to the radial pull of the blades 360 in operation. However, the attachment region 380 may have relatively low hoop strength due to discontinuities established by the slots 374S and may therefore serve as an additional parasitic radial load on the disk 372 inward of the inner boundary 382. The turbine blades 360 can incorporate CMC or other ceramic materials to reduce radial loads on the attachment region 380. Because of the reduced radial loads on the attachment region 380, the attachment region 380 can be dimensioned to reduce the parasitic loads and establish a relatively lightweight turbine rotor 347.

The attachment region 380 defines an array of slots $374_S$ distributed about the outer periphery $374op$ of the disk 372 and longitudinal axis A, as illustrated in FIG. 7. Each turbine blade 360 and slot $374_S$ extends in the axial, circumferential and radial directions X, T, R, as illustrated by FIGS. 5-7. Each of the slots $374_S$ is dimensioned to extend radially inward in the radial direction R from the outer boundary 384 to the inner boundary 382. Each of the slots $374_S$ is dimensioned to slidably receive a root section $360_R$ of a respective one of the turbine blades 360 to mount the turbine blades 360 to the disk assembly 349. The root section $360_R$ may be moved in a direction DI (FIG. 6) such that the root section $360_R$ is at least partially received into the respective slot $374_S$ to secure the turbine blade 360.

The disk assembly 349 can establish a relatively high speed, compact arrangement. Referring to FIG. 7, with continuing reference to FIG. 5, the inner boundary 382 establishes a live rim radius $R_L$ relative to the longitudinal axis A. The live rim radius $R_L$ may be associated with a radial outer limit where the disk 372 is capable of substantially reacting hoop stresses caused by centrifugal loads imposed by the rotating turbine blades 360. The outer boundary 384 establishes a dead rim radius $R_D$ relative to the longitudinal axis A. Each disk 372 establishes a respective disk ratio $R_L:R_D$ of the live rim radius $R_L$ to the dead rim radius $R_D$. The disk ratio $R_L:R_D$ can be greater than or equal to about 0.8:1 for at least one or more (or each) disk 372 of the disk assembly 349. For example, the disk establishing the disk ratio $R_L:R_D$ according to any of the values disclosed herein can include an aftmost disk $172_{AF}$ of the disks 172 of FIG. 2 and an aftmost disk $272_{AF}$ of the disks 272 of FIG. 3. The disclosed ratios and quantities associated with the disk 372 can be incorporated into any of the disks and turbines disclosed herein, including the turbines 46, 54 of FIG. 1 and each of the disks 172, 272 of FIGS. 2 and 3. For example, the disk ratio $R_L:R_D$ can be greater than or equal to about 0.8:1 for each one of the disks 172, 272, 372 of the turbine assemblies 145, 245, 345. The disk ratio $R_L:R_D$ can be greater than or equal to about 0.85:1, or more narrowly less than or equal to about 0.95:1 for each one of the disks 172, 272, 372. The disclosed attachment techniques can be utilized in combination with CMC and other ceramic turbine blades to establish relatively high disk ratios $R_L:R_D$.

Each row 355 of turbine blades 360 establishes a radial distance R1 between the longitudinal axis A and the radially outermost portion of the turbine blades 360, which can be established by the tips 360T of the turbine blades 360 (shown schematically in FIG. 7 for illustrative purposes). Each row 355 of turbine blades 360 establishes a blade ratio $R_D:R1$ of the dead rim radius $R_D$ to the radial distance R1. The blade ratio $R_D:R1$ can be less than or equal to about 0.5:1 for at least one row 355 of turbine blades 360. For example, the blade ratio $R_D:R1$ can be less than or equal to about 0.5:1 for at least the aftmost rows $155_{AF}$, $255_{AF}$ of turbine blades 160, 260 (FIGS. 2-3). It should be understood that the disclosed values of the blade ratio $R_D:R1$ can be established by any and each of the blade rows and disks of the turbines disclosed herein. The disclosed blade ratios $R_D:R1$ can be utilized in combination with the disclosed disk ratios $R_L:R_D$ to establish a relatively compact turbine arrangement.

Referring to FIG. 6, with continuing reference to FIGS. 5 and 7, each slot $374_S$ and the root section $360_R$ of each turbine blade 360 can have a complementary geometry to secure the root section $360_R$ in the respective slot $374_S$. The attachment region 380 of the disk 372 includes an array of attachment members 386 distributed about the longitudinal axis A. Each attachment member 386 includes a main body 387 extending outwardly from a neck 390. A pair of protrusions (e.g., teeth) 388 extend outwardly from opposed sides of the main body 387. Protrusions 388 on opposed sides of the slot $374_S$ cooperate to capture or trap the root section $360_R$ of the turbine blade 360 in the slot $374_S$ to limit relative radial and circumferential movement between the turbine blade 360 and disk 372. The protrusions 388 may establish an attachment boundary 392 (shown in dashed lines in FIGS. 5 and 7 for illustrative purposes). The radially innermost faces of the slots $374_S$ establish the inner boundary 382. The outer boundary 384 follows the contour of the outer periphery $374_{OP}$ of the disk 372. The attachment boundary 392 is established between the inner boundary 382 and outer boundary 384.

Each row 355 of turbine blades 360 defines a blade volume $V_B$ (FIG. 5) associated with a respective disk volume $V_D$ (FIGS. 5-7). The blade volume $V_B$ is defined as a sum of portions of the turbine blades 360 between the inner boundary 382 and the outer boundary 384 captured in the slots $374_S$ in an installed position, as illustrated in FIG. 5. The disk volume $V_D$ is defined as a sum of portions of the respective disk 372 between the inner boundary 382 and the outer boundary 384 that extend between the axial faces of the respective disk 372. The disk volume $V_D$ can be established by at least the attachment region 380. The disk 372 and respective row 355 of turbine blades 360 establish a volumetric ratio $V_B:V_D$ of the blade volume $V_B$ to the disk volume $V_D$. The disclosed attachment region 380 can be utilized to establish a relatively high volumetric ratio $V_B:V_D$. The volumetric ratio $V_B:V_D$ can be equal to or greater than 2.0:1, or more narrowly less than or equal to 4.0:1, for at least one or more (or each) disk 372 of the turbine 345. Turbine blades 360 made of a monolithic ceramic may be utilized to establish volumetric ratios $V_B:V_D$ that are equal to about 2.0:1, for example. Turbine blades 360 incorporating CMC materials may be utilized to establish volumetric ratios $V_B:V_D$ that are equal to or greater than 2.5:1, or more narrowly less than or equal to 3.5:1, such as about 3.0, which may provide an even more compact turbine arrangement. The disclosed volumetric ratios $V_B:V_D$ can be utilized to reduce a mass of the disk 372 in the attachment region 380, including relatively greater proportions of ceramic materials, which can reduce deflection of the turbine rotor 347 and variation in a dimension of the clearance gap G (see, e.g., FIG. 2) which can improve efficiency, and can reduce an overall weight of the engine.

Referring to FIG. 5, the attachment members 386 can be dimensioned to establish a relatively high volumetric ratio $V_B:V_D$. A minimum width of the neck 390 establishes a first width W1. A minimum width of the adjacent slot $374_S$ establishes a second width W2. The second width W2 can be established between opposed protrusions 388. A width of the turbine blade 360 received in the respective slot $374_S$ can be substantially equal to the second width W2. The second width W2 may be established along the attachment boundary 392. A ratio W1:W2 of the first width W1 to the second width W2 may be less than or equal to about 0.5:1, or more narrowly less than or equal to about 0.35:1. Ratios W1:W2 of less than or equal to about 0.25:1 may establish even greater volumetric ratios $V_B:V_D$.

The disclosed attachment techniques and incorporation of turbine blades including CMC and other ceramic materials can be utilized to reduce a weight of the disk assembly and increase rotational speeds while maintaining a determined disk size and weight sufficient to carry the turbine blades in operation. Reductions in turbine weight may reduce an overall weight of the engine and improve efficiency. The reduced spinning mass may also reduce deflection of the turbine rotor, which can improve turbine efficiency.

It should be understood that relative positional terms such as "forward," "aft," "upper," "lower," "above," "below," and the like are with reference to the normal operational altitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A turbine for a gas turbine engine, comprising:
a shaft rotatable about a longitudinal axis;
a turbine rotor including one or more rows of turbine blades and a disk assembly coupled to the shaft, wherein each of the turbine blades includes an airfoil section extending radially outwardly from a root section relative to the longitudinal axis, and each of the turbine blades comprises a ceramic matrix composite (CMC) material;
wherein the disk assembly includes one or more metallic disks each having an attachment region extending radially between an inner boundary and an outer boundary, the outer boundary is established by an outer periphery of the respective disk, the attachment region defines an array of slots distributed about the outer periphery, each of the slots extends radially inwardly from the outer boundary to the inner boundary, and each of the slots is dimensioned to receive the root section of a respective one of the turbine blades to mount the turbine blades to the disk assembly;
wherein the inner boundary establishes a live rim radius relative to the longitudinal axis, the outer boundary establishes a dead rim radius relative to the longitudinal axis, each of the one or more disks establishes a disk ratio of the live rim radius to the dead rim radius, and the disk ratio is greater than or equal to 0.8:1 for at least one disk of the one or more disks; and
wherein the attachment region includes an array of attachment members that define the array of slots, a minimum width of each of the attachment members establishes a first width, a minimum width of each of the slots establishes a second width, and a ratio of the first width of each one of the respective attachment members to the second width of an adjacent one of the slots is less than or equal to 0.5:1.

2. The turbine as recited in claim 1, wherein the one or more rows of turbine blades includes a plurality of rows of turbine blades distributed axially with respect to the longitudinal axis, the one or more disks includes a plurality of disks that mount respective rows of the plurality of rows of turbine blades, and the at least one disk establishing the disk ratio includes an aftmost one of the plurality of disks relative to the longitudinal axis.

3. The turbine as recited in claim 2, wherein the disk ratio is greater than or equal to 0.8:1 for each one of the plurality of disks in the turbine.

4. The turbine as recited in claim 3, wherein each of the rows of turbine blades establishes a radial distance between the longitudinal axis and a radially outermost portion of the turbine blades and establishes a blade ratio of the dead rim radius to the radial distance, and the blade ratio is less than or equal to 0.5:1 for at least an aftmost row of the plurality of rows of turbine blades.

5. The turbine as recited in claim 4, wherein the disk ratio is greater than or equal to 0.85:1 and is less than or equal to 0.95:1 for each one of the plurality of disks in the turbine.

6. The turbine as recited in claim 5, wherein a cross-sectional area is defined at a downstream end of the turbine rotor, the turbine rotor is rotatable at a first speed measured at an engine redline condition, a performance quantity is defined by the cross-sectional area multiplied by the first speed squared, and the performance quantity is equal to or greater than $5.0 \times 10^2$ in$^2$ rpm$^2$.

7. The turbine as recited in claim 1, wherein each of the one or more rows of turbine blades includes at a quantity of least 40 but no more than 70 turbine blades.

8. The turbine as recited in claim 1, wherein:
a total number of the rows of turbine blades includes at least three rows, but no more than six rows; and
the shaft interconnects the disk assembly and a geared architecture that drives a propulsor for propulsion.

9. The turbine as recited in claim 1, wherein:
each of the attachments members includes a main body extending radially from a neck and includes a pair of protrusions extend circumferentially from opposite sides of the main body relative to the longitudinal axis;
the minimum width of each of the attachment members is established across the respective neck; and
the protrusions on opposite sides of the respective slot are dimensioned to establish the minimum width of the respective slot such that the protrusions cooperate to capture the root section in the slot.

10. A gas turbine engine comprising:
a propulsor section including a propulsor rotatable about an engine longitudinal axis;
a compressor section including a first compressor and a second compressor;
a turbine section including a first turbine and a second turbine, wherein the first turbine includes a first turbine rotor, and the second turbine includes a second turbine rotor; and
wherein at least one of the first turbine rotor and the second turbine rotor comprises:
one or more rows of turbine blades and a disk assembly, wherein each of the turbine blades includes an airfoil section extending from a root section, and each of the turbine blades comprises a ceramic matrix composite (CMC) material;

wherein the disk assembly includes one or more metallic disks each having an attachment region extending radially between an inner boundary and an outer boundary relative to the engine longitudinal axis, the outer boundary is established by an outer periphery of the respective disk, the attachment region defines an array of slots distributed about the outer periphery, each of the slots extending radially inwardly from the outer boundary to the inner boundary, and each of the slots is dimensioned to receive the root section of a respective one of the turbine blades to mount the turbine blades to the disk assembly;

wherein the inner boundary establishes a live rim radius relative to the longitudinal axis, the outer boundary establishes a dead rim radius relative to the longitudinal axis, each of the one or more disks establishes a disk ratio of the live rim radius to the dead rim radius, and the disk ratio is greater than or equal to 0.8:1 for the one or more disks; and wherein the attachment region includes an array of attachment members that define the array of slots, a minimum width of each of the attachment members establishes a first width, a minimum width of each of the slots establishes a second width, and a ratio of the first width of each one of the respective attachment members to the second width of an adjacent one of the slots is less than or equal to 0.5:1.

11. The gas turbine engine as recited in claim 10, wherein the second turbine rotor is axially aft of the first turbine rotor relative to the engine longitudinal axis, and further comprising:
a first turbine shaft interconnecting the first compressor and the first turbine rotor;
a geared architecture; and
a second turbine shaft interconnecting the geared architecture and the second turbine rotor such that the second turbine rotor drives the propulsor through the geared architecture.

12. The gas turbine engine as recited in claim 11, wherein: the second turbine comprises the at least one disk; and
a total number of the rows of turbine blades in the second turbine includes at least three rows, but no more than six rows.

13. The gas turbine engine as recited in claim 12, wherein: at least one of the rows of turbine blades is a row of shrouded turbine blades.

14. The gas turbine engine as recited in claim 10, wherein: each of the one or more rows of turbine blades includes a quantity of at least 25 but no more than 100 turbine blades.

15. The gas turbine engine as recited in claim 14, wherein the disk ratio is less than or equal to 0.95:1 for each disk of the one or more disks in the second turbine.

16. The gas turbine engine as recited in claim 14, wherein the one or more rows of turbine blades includes a plurality of rows of turbine blades, each of the rows of turbine blades establishes a radial distance between the engine longitudinal axis and a radially outermost portion of the turbine blades and establishes a blade ratio of the dead rim radius to the radial distance, and the blade ratio is less than or equal to 0.5:1 for at least an aftmost row of the plurality of rows of turbine blades.

17. The gas turbine engine as recited in claim 16, wherein the second turbine rotor is axially aft of the first turbine rotor relative to the engine longitudinal axis, and further comprising:
a first turbine shaft interconnecting the first compressor and the first turbine rotor;
an epicyclic geared architecture; and
a second turbine shaft interconnecting the geared architecture and the second turbine rotor such that the second turbine rotor drives the propulsor through the geared architecture.

18. The gas turbine engine as recited in claim 10, wherein the propulsor is a fan, and a fan case surrounds the fan to define a bypass duct.

19. The gas turbine engine as recited in claim 18, wherein: the second turbine comprises the at least one disk; and
a total number of the rows of turbine blades in the second turbine includes at least three rows, but no more than six rows.

20. The gas turbine engine as recited in claim 10, wherein: each of the attachments members includes a main body extending radially from a neck and includes a pair of protrusions extend circumferentially from opposite sides of the main body relative to the longitudinal axis;
the minimum width of each of the attachment members is established across the respective neck; and
the protrusions on opposite sides of the respective slot are dimensioned to establish the minimum width of the respective slot such that the protrusions cooperate to capture the root section in the slot.

* * * * *